May 11, 1948. H. PEARCE 2,441,370
APPARATUS FOR OPHTHALMIC PHOTOGRAPHY
Filed April 20, 1943 4 Sheets-Sheet 1

INVENTOR
HAROLD PEARCE
Smart & Biggar
BY
ATTORNEYS.

May 11, 1948.  H. PEARCE  2,441,370
APPARATUS FOR OPHTHALMIC PHOTOGRAPHY
Filed April 20, 1943   4 Sheets-Sheet 2

INVENTOR
HAROLD PEARCE

Smart & Biggar
BY—
ATTORNEYS

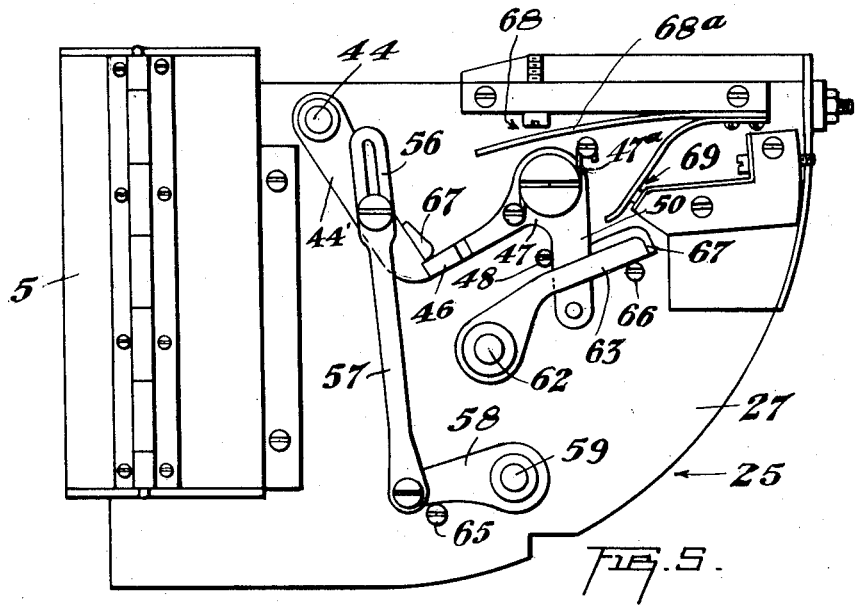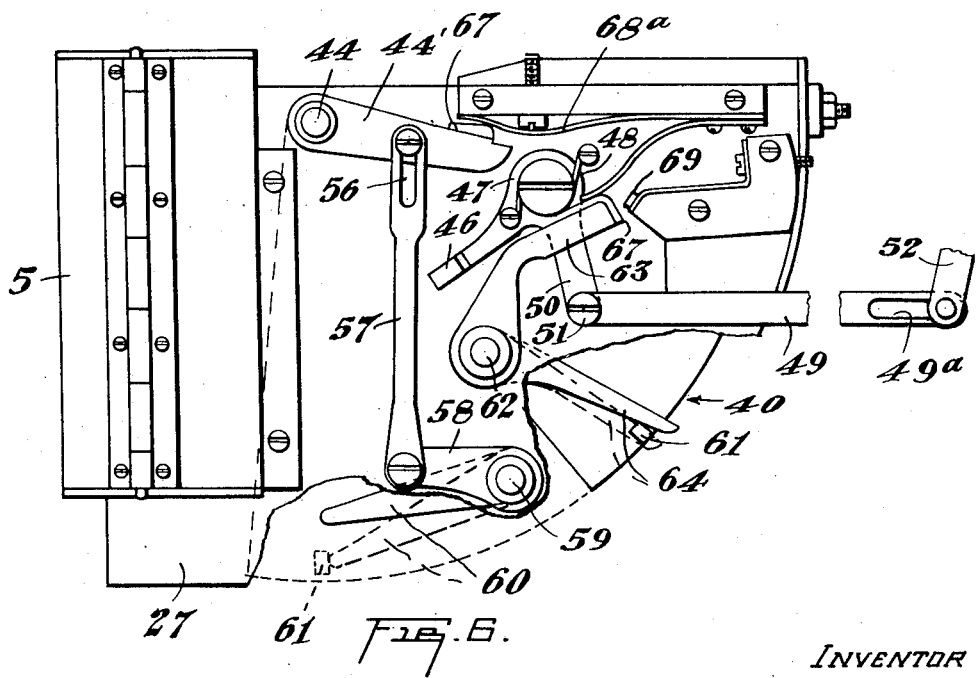

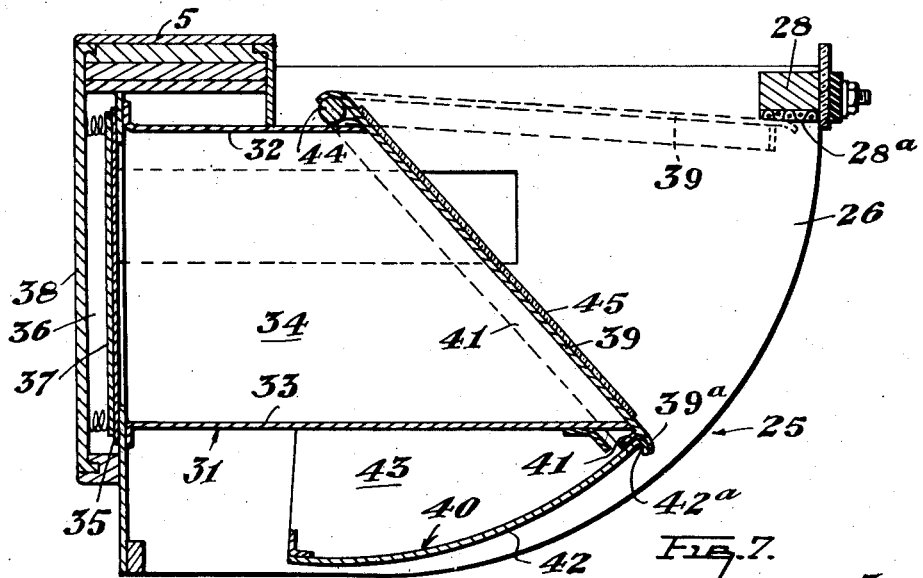
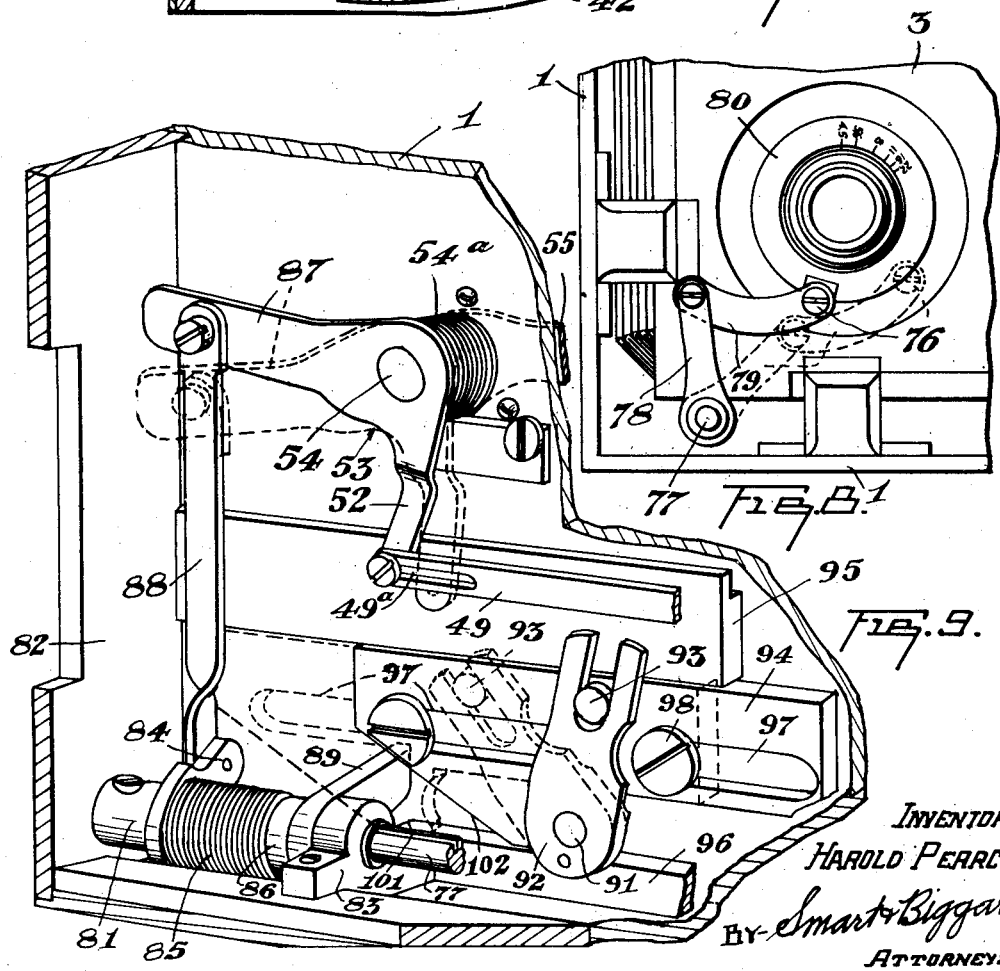

Patented May 11, 1948

2,441,370

UNITED STATES PATENT OFFICE 2,441,370

APPARATUS FOR OPHTHALMIC PHOTOGRAPHY

Harold Pearce, Ottawa, Ontario, Canada, assignor to The Honorary Advisory Council for Scientific and Industrial Research, Ottawa, Ontario, Canada, a corporation of Canada Application April 20, 1943, Serial No. 483,771

4 Claims. (Cl. 95—11.5)

This invention relates to photographic apparatus and more particularly to apparatus for photographing the cornea of the eye.

Of the many types of cameras previously made none has been really successful for photographing the cornea of the eye, although a camera which could be used for this purpose has been needed for a long time. Thus, for example, in the study of riboflavin deficiencies it has been known that the extent of corneal vascularization, i. e. the spread of blood vessels in the cornea of the eye, is related to such deficiency. These blood vessels are, however, minute and there has been no way of making an acurate record of them or of changes in their appearance with increasing or decreasing riboflavin deficiency.

Hitherto, the only instrument for examining the cornea has been the slit lamp. This consists of a source of fairly strong steady light formed into a beam of slit form and so directed as to be reflected from the iris out through the cornea in the area to be examined. This area is then viewed under suitable magnification through an appropriate optical instrument. The slit lamp is tiring for the patient's eyes because the examination takes some time and the light must remain on throughout. However, the volume of light which can be used without injury to the eye is not great enough to permit a satisfactory photograph to be taken. Consequently, the only records of the state of the cornea which could hitherto be made were drawings based on observations by the slit lamp. This unsatisfactory situation is shown by the fact that such drawings form the only illustrations of corneal vascularization in a number of recent articles on riboflavin deficiency by Drs. Sydenstrecker, Sebrell, Cleckley and Kruse, who are outstanding investigators in this field; see, for example, Journal of the American Medical Association, vol. 114, pages 2437–2445, June 22, 1940.

The apparatus of the present invention has been designed particularly to provide photographic records of corneal conditions and especially of riboflavin deficiencies as indicated by blood vessels in the cornea of the eye. While the apparatus was devised particularly for this work, it has numerous features which are of general utility in the field.

According to the invention the apparatus for ophthalmic photography comprises essentially means for focussing a beam of light of an intensity substantially greater and a duration substantially less than that of a photographic flash bulb, a camera, means for focussing said camera on the eye to be protographed, and means for directing said beam at the eye in a direction such as to avoid reflection along the camera axis. The source of light is preferably adjustable around a 360° arc in a plane perpendicular to the axis of the camera. The camera itself comprises, as usual, a light-tight receptacle containing light-sensitive material, and its principal features of novelty reside in the shutter mechanism and the mechanism for setting the diaphragm opening. The shutter mechanism is associated with the light source and includes means for opening the receptacle to light and thereby energizing the light source, and means brought into action by the opening of the receptacle to close it again and thereby de-energize the light source, the receptacle being maintained light-tight during the re-setting of the shutter mechanism. The diaphragm setting mechanism is of a novel type in that the diaphragm opening, when the photograph is taken, is predetermined without any movement of the diaphragm and the latter remains in full open position during focussing, being brought to its predetermined opening during initial movement of the shutter tripping mechanism.

The invention will be described in more detail by reference to the attached drawings which illustrate the form thereof developed for opthalmic work.

In the drawings,

Figure 5 is an elevation from the left in Figure 4 showing the shutter tripping mechanism in normal position.

Figure 6 is an elevation corresponding to Figure 5 but showing the mechanism after tripping, with certain parts in an intermediate stage being shown in dotted lines.

Figure 7 is a section taken on the line 7—7 of Figure 4, but with the parts in a slightly different position.

Figure 8 is a partial front view of the camera showing the mechanism for setting the diaphragm, and Figure 9 is a detail of the means for predetermining the diaphragm setting and subsequently bringing the diaphragm to that setting.

Figure 1:
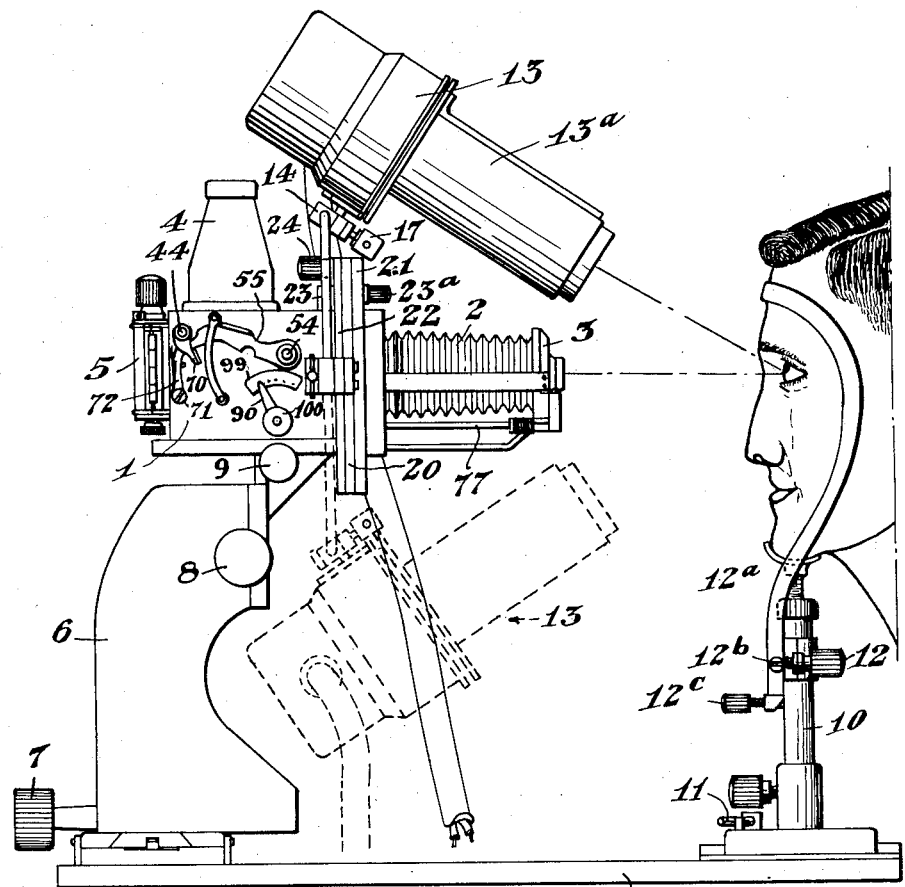
Figure 1 is a general side elevation of the camera set up for operation with a subject ready to be photographed.
Figure 2:
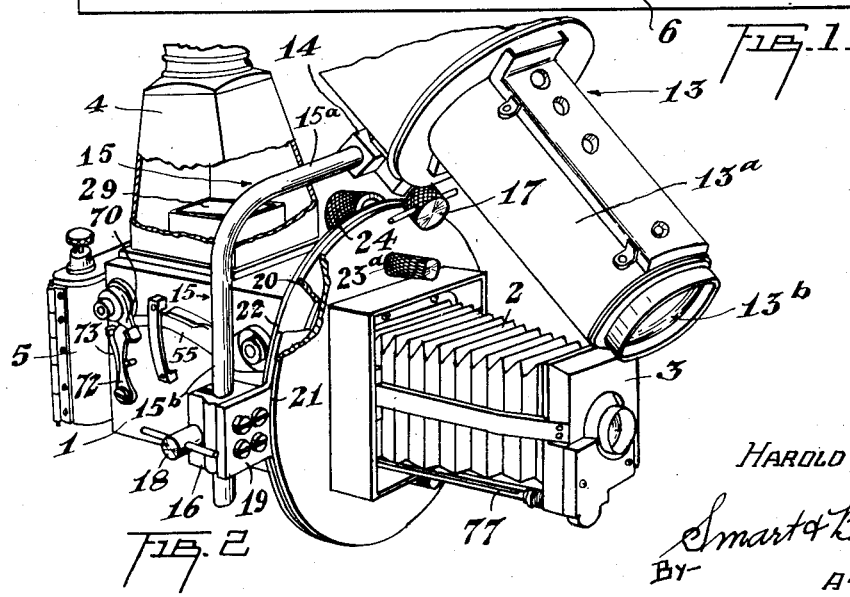
Figure 2 is a partial perspective view with parts broken away.

As shown in Figures 1 and 2, the camera comprises the usual casing 1, extensible bellows 2 and a lens and diaphragm holding casing 3 at the outer end of the bellows. On top of the casing 1 is a focussing hood 4 and at the rear of the casing is a suitable holder 5 for light sensitive material, which in the case illustrated is in the form of a film. The camera is supported from a base 6 in such a way that it may be adjusted transversely to the camera axis through the knob 7, vertically through the knob 8, and longitudinally of such axis through the knob 9, each of these knobs operating appropriate rack and pinion mechanism, and suitable known means being provided for securing the parts in adjusted position.

Opposite the camera is a support 10 for the head of the person whose eye is to be photographed, this support being adjustable longitudinally of the camera axis through the clamping screw 11 and vertically through the knob 12. It is provided with a holder 12a pivoted at 12b, whose angular positions may be adjusted through a knob 12c to ensure that the head of the person to be photographed, whose forehead is pressed against it, will be held vertical. Because of the provision of the adjustable camera support and head support, the position of the eye to be photographed with relation to the camera can be adjusted on the basis of the first subject to be photographed and succeeding subjects may then be photographed with either no further adjustment or only minor adjustments necessitated by slight differences in relative positions of the eyes in the heads.

Supported for adjustment to any one of a number of desired positions around the longitudinal axis of the camera is a casing 13 for a light source capable of giving upon energization a flash of light of extreme intensity and extremely short duration. The type of light source for this purpose which has been successfully used in practice is that model of the well known "Kodak Kodatron" equipment, made by the Eastman Kodak Co., which absorbs about 2,000,000 watts of energy and has a flash of a duration of $1/30,000$ of a second. The casing 13 has a forward cylindrical part 13a which encloses the bulb and at its front end holds one or more condensing lenses 13b which form a beam of the light produced by the bulb. The casing 13 is mounted at an angle to the axis of the camera so that it directs the beam of light to intersect the camera axis at the point to be photographed in such a way that none of the light is reflected along the camera axis. In this way fogging of the light sensitive material is avoided.

The casing 13 is supported from the camera casing 1 by an arm 15, the horizontal branch 15a of which passes through a bracket 14 on the casing 13 and the vertical arm 15b of which passes through a bracket 16. The bracket 14 is slidable and rotatable on the branch 15a of the arm and may be fixed in adjusted position by a thumbscrew 17, while the branch 15b of the arm is slidable and rotatable in the bracket 16 and may be fixed in adjusted position in that bracket by a thumbscrew 18. The bracket 16 is carried by an extension 19 of a ring 20.

The light source is carried by a ring 20 supported for rotation between two fixed rings 21 and 22, which have square openings corresponding to the dimensions of the casing 1 so that the whole light assembly may be slipped onto the casing where it is secured in position against the block 23 on the casing by a bolt having a knurled knob 23a. The rings 21 and 22 are provided with a pair of registering openings through which a pin carried by a knob 24 may pass. The ring 20 is provided with a number of registering openings around its periphery, for example, four spaced at angles of 90° from each other. To free the ring for rotation the knob 24 is withdrawn towards the rear of the camera, that is, towards the focusing hood 4, and the ring 20 then rotated until the light source is in the desired position and one of the openings in the ring 20 registers with the pair of openings in the rings 21 and 22. The knob 24 is then released so that the pin passes through all three openings and secures the parts in adjusted position. One such position is indicated in full lines in Figure 1. The angular position 180° removed from it is indicated in dotted lines. The casing 13 is thus universally adjustable with respect to the camera casing 1.

Inside the casing 1 is an inner casing 25 (Figs. 4 and 7) having side walls 26 and 27 connected at their rear ends to the film holder 5 and at their forward upper ends to a cross-bar 28. The casing is open along its semi-circular front end, and within it is a light-tight receptacle 31 having top and bottom walls 32 and 33 and side walls 34 all supported at their rear ends on the forward wall 35 of the passage 36 for the film 37 in the holder 5. The receptacle is made light-tight at its rear end by the rear wall 38 of the film passage 36 and is normally kept light-tight at its forward end by the shutter mechanism.

Figure 3:
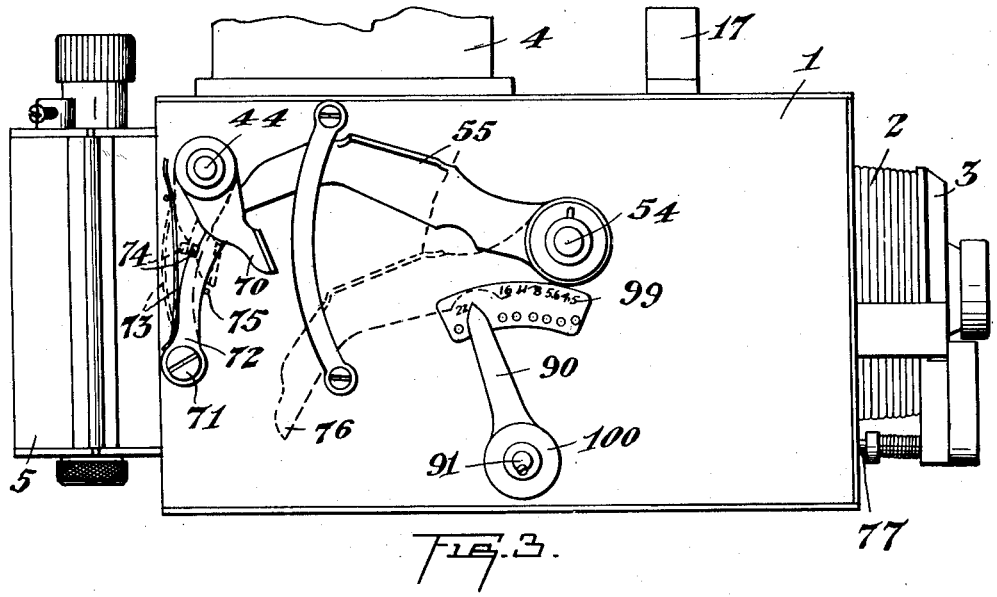
Figure 3 is a detail of the operating and resetting levers illustrated in Figure 1, showing their movement.

This mechanism consists of two covers 39 and 40, the cover 39 consisting of a flat plate, and the cover 40 consisting of a curved front plate 42 and side plates 43. A light-tight fit between the cover 39 and the cover 40 is assured by flanges 41 on the cover 39, which fit between the receptacle and the cover 40, and cooperating flanges 39a and 42a respectively on the forward end of the cover 39 and upper end of the plate 42. On the upper side of the cover 39 is mounted a mirror 45 by means of which light from the object to be photographed is reflected onto a ground glass 29 (Figure 2). The cover 39 is fixed to a shaft 44 and the cover 40 is rotatably mounted on this shaft through the side plates 43. The normal position of the mechanism is shown in Figure 7 where the cover 39 is closed and the cover 40 is open. The shaft 44 is urged by a spring (not shown) to rotate in an anti-clockwise direction so as to bring the cover 39 to the substantially horizontal open position shown in dotted lines in Figure 7. The cover 40 is also urged by appropriate spring means to rotate in the same direction so as to reach a closed position in contact with the cover 39 when the latter is open. The shaft 44 is normally prevented from rotating because fixed to its outer end is an arm 44', which is normally engaged by one arm 46 of a bell crank 47, this crank being resiliently held in the position shown in Figure 5 by the action of a spring 47a and a stop pin 48 on the wall 27 of the inner casing 25. The other arm 50 of the crank 47 is connected at 51 (Fig. 6) to a link 49 which has a lost motion connection at 49a (see also Figure 9) to an arm 52 of a bell crank 53 which is fixed on a shaft 54 extending out through the wall of the casing 1 and having an operating lever 55 (Figures 1 and 3) fixed to its outer end.

Connected to the arm 44' through a lost motion connection 56 is a link 57 the lower end of which is connected to an arm 58 fixed to a stub shaft 59 pivoted in the wall 27 of the casing 25 and carrying at its inner end between the wall 27 and the side wall 43 of the cover 40 another arm 60 which, when the parts are in the position of Figure 5, ocupies the dotted line position of Figure 6 and is held there by the spring 59a (Figure 4) and the engagement of the arm 58 by the stop 65 (Figure 5). It will be seen that in this position the end of the arm 60 lies in the path of a lug 61 carried on the wall 43 of the cover 40 and so holds this cover in the position shown in Figure 5, apart from its being so held by the cover 39 when the latter is in normal position.

Fixed to the outer end of a stub shaft 62 which is rotatably mounted in the wall 27, is an arm 63, and fixed to the inner end of the shaft 62 so as to extend between the walls 27 and 43 is an arm 64. When the parts are in the position shown in Figure 5, the arm 64 is held in this dotted line position by the spring 62a (Figure 4) and the engagement of the arm 63 by the stop 66 (Figure 5). Covers 67 of the insulating material are provided on the ends of the arms 44' and 63.

The energizing circuit for the light source 13 passes through a switch 68 which is normally open and a switch 69 which is normally closed as shown in Figure 5. The switches are arranged in series in the circuit, so that unless both switches are closed the lamp will not operate.

When a photograph is to be taken, the light source 13 is brought to the appropriate position for the particular aspect of the eye to be photographed. In the full line position of Figures 1 and 2 it is adjusted for photographing the inferior aspect and in the dotted line position for photographing the superior aspect. The person whose eye is to be photographed then adjusts his head on the support 10 as shown and looks at a spot on the centre of the lens 13b of the light source. Any necessary adjustments of the position of the camera are then made, and the photograph is ready to be taken.

Figure 4:
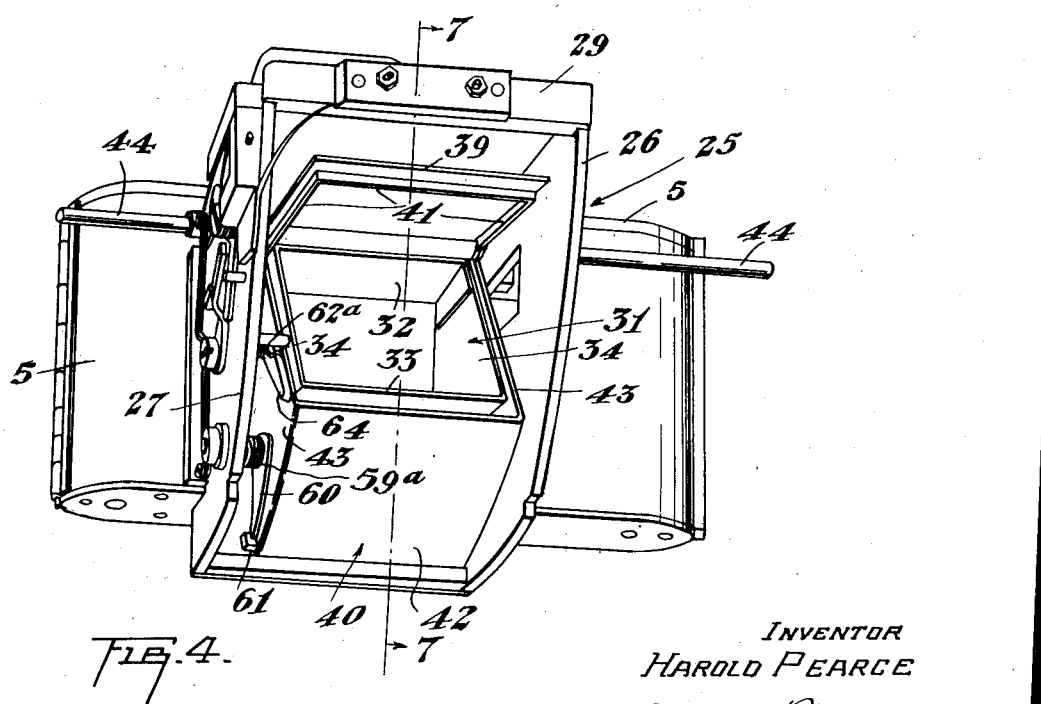
Figure 4 is a front view of the shutter mechanism inside the camera.

The normal position of the operating lever 55 (Figures 1 and 3), to which it is urged by a spring 54a (Figure 9) on the shaft 54, is the upper position. To take a photograph it is pressed down to the lower position shown in dotted lines in Figure 3. This action causes clockwise rotation of the arm 52 of the bell crank 53 and, when the lost motion allowed by the connection 49a is exhausted, moves the link 49 to the right in Figure 6 and causes anti-clockwise rotation of the bell crank 47. This withdraws the end of the arm 46 from the path of the arm 44', which then moves clockwise under the action of the spring on the shaft 44. With it moves the cover 39 because this cover, like the arm 44', is fixed to the shaft 44. In its upward movement the arm 44' engages, through its insulating cap 67, the leaf 68a of the switch 68 and closes that switch. This happens at a time when the cover 39 is, as shown in Figure 4, just short of its upper open position shown in dotted lines in Figure 7 but the cover 40 is still in its lower open position. As the switch 69 is still closed at this time the light source 13 is energized and an intense beam of light is directed to the eye of the subject and from there reflected along the axis of the camera through the lens and on the film 37. The clockwise movement of the arm 44' until just at the moment when the switch 68 is closed causes no movement of the link 57 because it is absorbed in the lost motion connection 56. The final movement of the arm 44', from the time the switch 68 is closed until the cover 39 strikes the felt strip 28a (Figure 7), pulls the link up to the position shown in Figure 6 and thus causes clockwise rotation of the arm 60 to the full line position of that figure. This motion of the arm 60 disengages the lug 61 and frees the cover 40 to rotate anti-clockwise under the influence of its spring to a position such that it shuts off light from the receptacle 31. Just towards the end of the upward movement of the cover 40, the lug 61 engages the arm 64 and moves it from the dotted line to the full line position of Figure 6, causing the arm 63 to rotate anti-clockwise to the position shown in Figure 6 and open the switch 69, thus deenergizing the light source 13. The cover 39 is now in its open position and the cover 40 in its closed position, and between them they prevent access of light to the receptacle 31. Fast to the end of the shaft 44 outside the casing 1 is a resetting lever 70, which, when the cover 39 is in the full line position of Figure 7, is in the dotted line position of Figure 3. Pivoted to the wall of the casing 1 at 71 is a stop arm 72 which is resiliently urged to rotate in a clockwise direction by a leaf spring 73 but is prevented from doing so by a lug 74 on it which engages the lever 70 when the latter is in the dotted line position of Figure 3. When the shutter mechanism is tripped by downward pressure on the operating lever 55, anti-clockwise rotation of the shaft 44 caused by release of the arm 45 rotates the resetting lever 70 to the full line position of Figure 3 and this rotation releases the stop arm 72 to move anti-clockwise to the full line position of Figure 3 where it is stopped by a pin 75.

When the operating lever 55 is released it returns under the influence of the spring on the shaft 54 to its upper full line position. At the end of its upward movement its tail 76 snaps over the head of the arm 72 which engages under it and prevents the arm 55 from being operated again until the shutter mechanism has been reset. This resetting is effected by pressing the resetting lever 70 towards the rear of the camera in a clockwise direction and so rotating the shaft 44 in the same direction. Upon the clockwise rotation of the shaft 44 the cover 39, which is fixed to it, is moved down from the dotted line position in Figure 7 and carries with it the cover 40, so that during the whole of the resetting movement the entry of light to the receptacle 31 is prevented. When the cover 39 again reaches the full line position of Figure 7, the arm 44' engages under the end of the arm 46, which has returned to the position of Figure 5 upon release of the operating lever 55. At the same time the clockwise movement of the arm 44' permits the arm 60 to return under the influence of the spring 59a to the dotted line position of Figure 6, where it engages the lug 61 on the cover 40. The parts are now reset in the normal position with the various levers in the position of Figure 5 and the dotted line position of Figure 6, and the camera is ready for the taking of another photograph.

The diaphragm setting mechanism is illustrated in Figures 8 and 9. Fixed to the end of a rod 77, which extends longitudinally of the camera, is an arm 78 connected by means of a link 79 to the diaphragm setting ring 80 of the camera. When the parts are in the full line position shown in Figure 8 the diaphragm is adjusted to its largest opening, while when they are in the dotted line position of that figure, the diaphragm is adjusted to its smallest opening. The rod 77 is slidable in and keyed to a sleeve 81 rotatably carried in a transverse wall 82 of the casing 1 and in a bearing 83. The rod thus turns with the sleeve but may slide through it as the bellows 2 is extended or collapsed.

The sleeve 81 is adapted to be turned by movement of the bell crank 53 (previously referred to in connection with Figure 6), an arm 87 of which is connected by means of a link 88 to the outer end of an arm 84 which can turn freely on the sleeve 81 but is connected to the latter by a spring 85 having one end secured to the arm and the other end to a collar 86 on the sleeve. The strength and tension of the spring 85 are so adjusted that unless the sleeve 81 is positively prevented from turning, any turning movement of the arm 84 will turn the sleeve correspondingly. The bell crank 53 is normally held by the spring 54a in the position shown in dotted lines in Figure 9. When the bell crank is in this position, it acts through the link 88, arm 84, spring 85, sleeve 81 and rod 77 to hold the arm 78 and link 79 in the full line position of Figure 8 and thus to keep the diaphragm adjusted at its maximum stop. Provided that the sleeve 81 and thus the rod 77 are not prevented from following movement of the arm 84, movement of the bell crank 53 from the dotted line to the full line position of Figure 9 will move the parts 78 and 79 to the dotted line position of Figure 8 and will thus reduce the diaphragm opening to its minimum.

The extent to which the diaphragm opening will actually be altered during such movement of the bell crank 53 is determined by the adjustment of a slide 94, which is movable in rails 95 and 96 to an extent governed by the coaction of slots 97 in the slide and pins 98 on the side wall of the casing 1, the two extreme positions of the slide being shown respectively in full and dotted lines in Figure 9. The slide has a forward inclined face 102 which lies in the path of turning movement of an arm 89 fixed to the sleeve 81. When the bell crank 53 is in its normal dotted line position, the outer end of the arm 89 lies in an opening 101 in the bottom rail 96 for the slide. If the slide is in the dotted line position, then it will prevent any movement of the arm 89, with the result that all movement of the arm 84 will be absorbed in tightening the spring 85 and the sleeve 81 will stay still. On the other hand, when the slide 94 is in its full line position, movement of the arm 89 and thus of the sleeve 81 is not interfered with at all, as the arm 89 strikes the inclined face 102 only as the link 88 completes its upward movement. When the slide is in some intermediate position, then part of the turning movement of the arm 84 is communicated to the sleeve 81 and rod 77, but the remainder, after the arm 89 strikes the face 102, is absorbed in tightening the spring.

The position of the slide 94 is governed by an indicator 90 (Figure 3) which can be adjusted by means of a knob 100 to a desired position on a diaphragm opening scale 99. The indicator is fast to the outer end of a shaft 91 extending through the wall of the casing 1 and having fixed to its inner end an arm 92 with a forked end which embraces a pin 93 on the slide. When the indicator 90 is in the position shown in Figure 3 the arm 92 is in the full line position of Figure 9, while when the indicator is at the extreme right of the scale the arm 92 is in the dotted line position of Figure 9.

If a picture is to be taken at a stop of say, F.11, the indicator 90 is moved to the appropriate point on the scale 99. It will be appreciated that, because the end of the arm 89 normally lies in the opening 101 in the rail 96, this movement and the resultant movement of the slide 94 causes no movement of the diaphragm setting ring, so that the diaphragm remains open to its full extent for focussing. When the photograph is to be taken, the operating lever is depressed, thus turning the crank 53 towards the dotted line position of Figure 9. The diaphragm is accordingly closed to the required extent but is then prevented from closing further by engagement of the arm 89 with the inclined face 102 of the slide 94. Continued movement of the crank 53 merely tightens the spring 85 and finally, when the lost motion in the connection 49a has been taken up, moves the link 49 and trips the shutter mechanism. When the lever 55 is released, the diaphragm returns to its maximum opening ready for focussing and upon the taking of the next photograph will again be closed to the same stop unless in the meantime the indicator 90 has been moved.

What I claim as my invention is:

1. Photographic apparatus comprising a light-tight receptacle containing light sensitive material, a light source, means for opening said receptacle to light and simultaneously energizing said light source, means brought into action by the opening of the receptacle to close it again, and means brought into action by said means for closing the receptacle to deenergize said light source.

2. Photographic apparatus comprising a receptacle containing light sensitive material, a cover for said receptacle, said cover when closed rendering said receptacle light tight, a light source, means for opening said cover to permit admission of light to said receptacle, means brought into operation by the opening of said cover to energize said light source, means operable upon the opening of said cover to close said receptacle, and means brought into action by the operation of said receptacle closing means to deenergize said light source.

3. Photographic apparatus comprising a receptacle containing light sensitive material, a cover for said receptacle, said cover when closed rendering said receptacle light tight, a light source, means for opening said cover to permit admission of light to said receptacle, means brought into operation by the opening of said cover to energize said light source, means operable upon the opening of said cover to close said receptacle, means brought into action by the operation of said receptacle closing means to deenergize said light source, said receptacle closing means moving to operative position in the same direction as said cover moves to open position and, when in operative position, abutting said open cover, and means for moving said cover to closed position to reset the apparatus and for thereby carrying said receptacle closing means to inoperative position, whereby said receptacle is kept closed during resetting of the apparatus.

4. A camera comprising a light-tight receptacle containing light sensitive material, two covers for preventing access of light to said material, one of said covers being normally held closed and the other being normally held open, means for opening the first cover and subsequently closing the second cover, an electrically energized light source, a circuit from said light source, said circuit including a normally open and a normally closed switch in series with one another, means carried by the first cover for closing the normally open switch as said cover reaches open position to complete said circuit and energize said light source, means operable as said cover reaches open position to release the second cover, and means carried by the second cover to open said normally closed switch as said second cover reaches closed position and thus deenergize said light source.

HAROLD PEARCE.

REFERENCES CITED

The following references are of record in the file of this patent:

UNITED STATES PATENTS

| Number | Name | Date |
|---|---|---|
| 571,806 | Stern | Nov. 24, 1896 |
| 816,907 | Garfield | Apr. 3, 1906 |
| 729,056 | Fraley | May 26, 1903 |
| 932,392 | Hutchings | Aug. 24, 1909 |
| 1,326,379 | Thompson | Dec. 30, 1919 |
| 1,521,780 | Maski | June 6, 1925 |
| 1,633,658 | Brown | June 28, 1927 |
| 1,741,526 | Kuhl | Dec. 31, 1929 |
| 2,006,007 | Zimmer | June 25, 1935 |
| 2,029,238 | Korling | Jan. 28, 1938 |
| 2,077,792 | Heine | Apr. 20, 1937 |
| 2,257,331 | Clarke | Sept. 30, 1941 |
| 2,258,140 | Kaletay | Oct. 7, 1941 |
| 2,262,509 | McNabb | Nov. 11, 1941 |
| 2,269,401 | Steiner | Jan. 6, 1942 |
| 2,283,533 | Brueske | May 19, 1942 |
| 2,293,784 | Werner | Aug. 25, 1942 |
| 2,353,893 | Hinline | July 18, 1944 |

FOREIGN PATENTS

| Number | Country | Date |
|---|---|---|
| 440,735 | Great Britain | June 6, 1936 |
| 522,148 | Great Britain | June 11, 1940 |